Dec. 11, 1928.

B. ZENDRON

PLANTER

Filed Oct. 8, 1927   4 Sheets-Sheet 1

1,695,074

Inventor

B. Zendron

By Lacey & Lacey, Attorneys

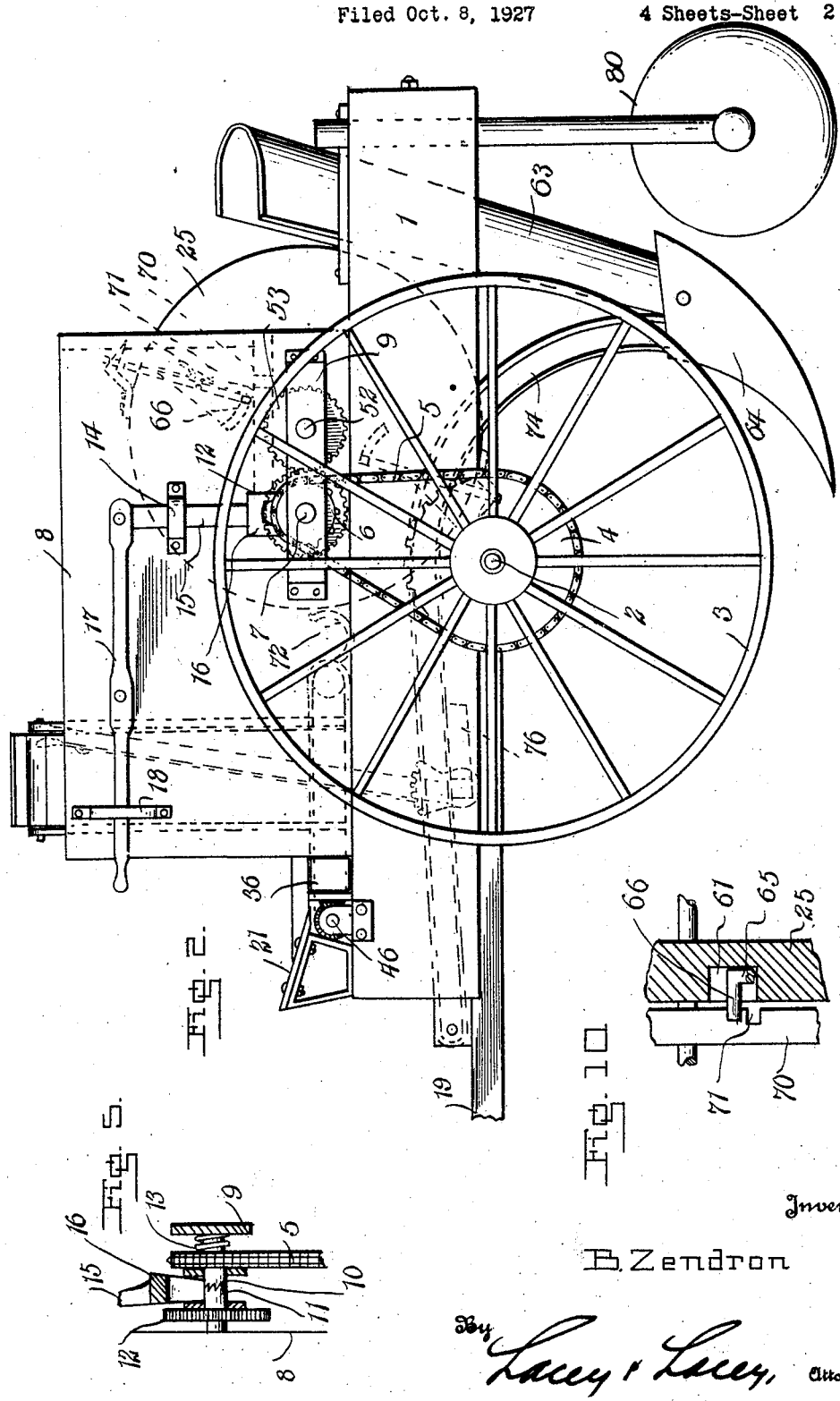

Dec. 11, 1928.　　　　　　　　　　　　　　　　　　1,695,074
B. ZENDRON
PLANTER
Filed Oct. 8, 1927　　　　4 Sheets-Sheet 3
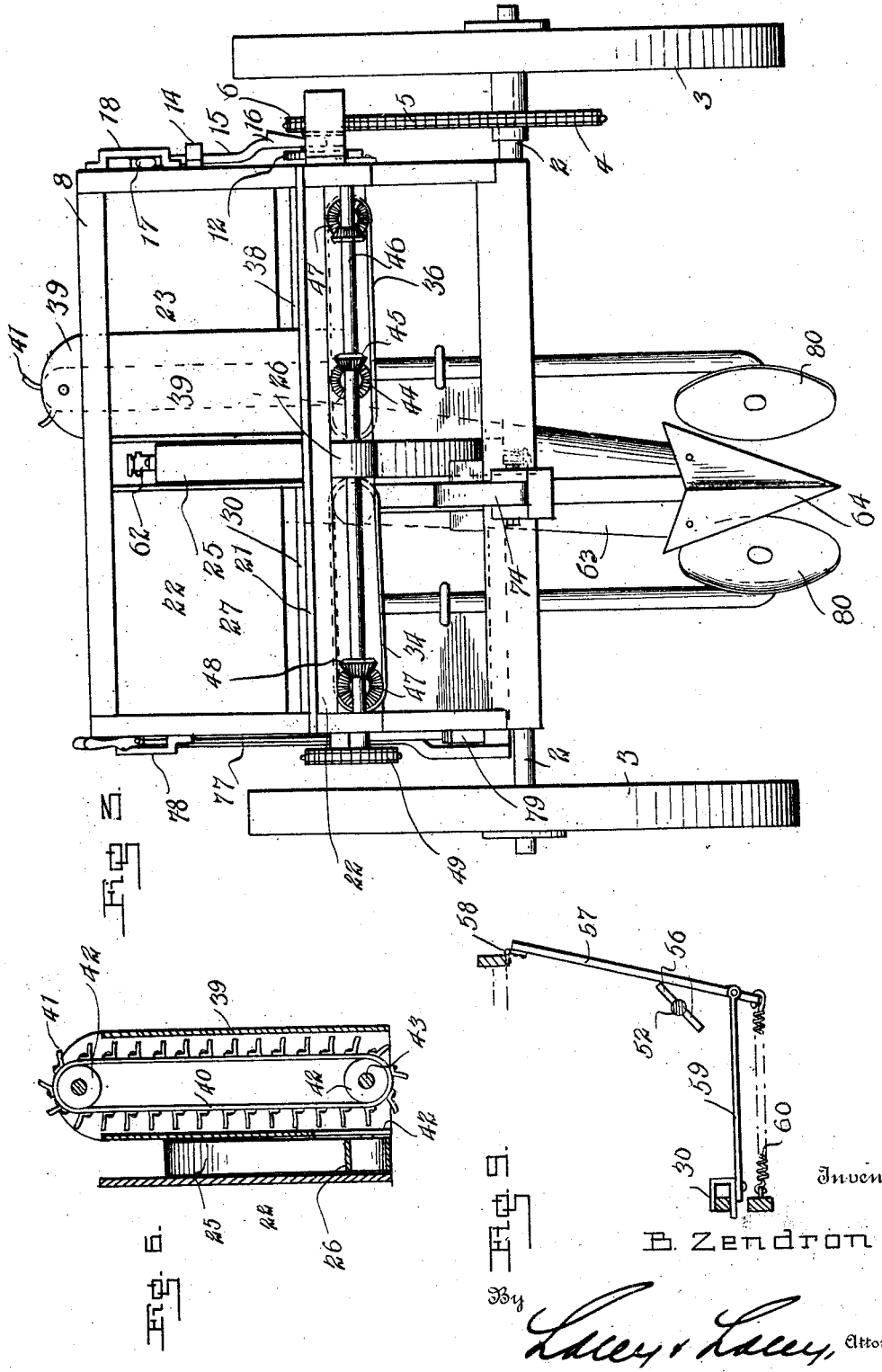

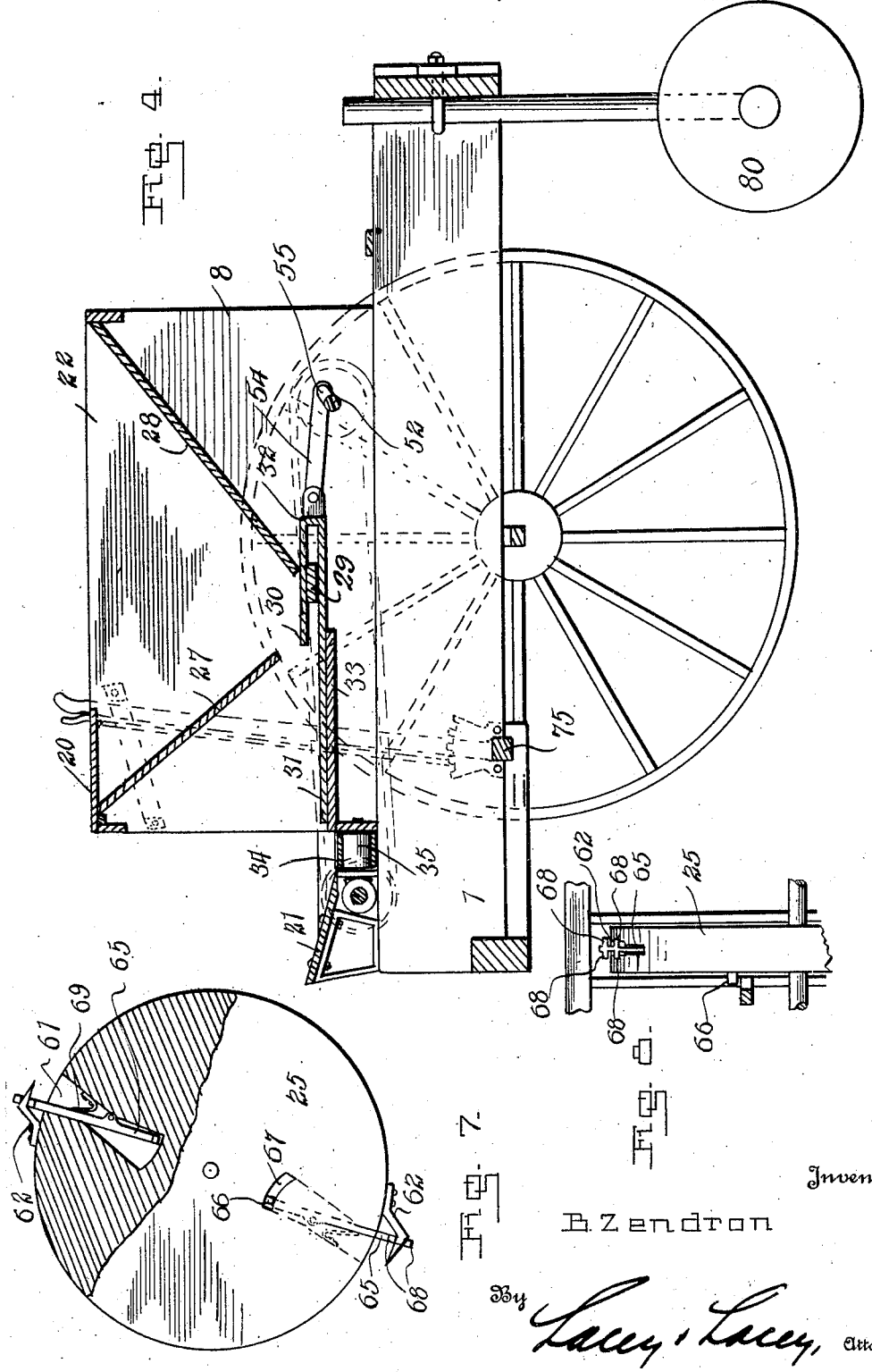

Patented Dec. 11, 1928.

1,695,074

UNITED STATES PATENT OFFICE.

BENJAMIN ZENDRON, OF CRAIG, COLORADO.

PLANTER.

Application filed October 8, 1927. Serial No. 224,848.

This invention is a planter designed more particularly for use in planting seed potatoes, and one object of the invention is to provide means whereby the seed will be successively taken from a hopper and carried to a seed tube and automatically discharged into the tube to be deposited in a furrow formed in the ground. Another object of the invention is to provide means whereby the seed stored in a hopper will be fed from the hopper without waste, and another object of the invention is to take up any excessive accumulation of seed and return the same to the feeding means, while a further object of the invention is to provide a novel transfer mechanism for transferring the seed positively from the feeding mechanism to the seed tube and furrow opener. These stated objects, and other objects which will incidentally appear in the course of the following description, are attained in such a machine as is illustrated in the accompanying drawings, and the invention resides in certain novel features which will be particularly pointed out in the appended claims.

In the drawings:

Fig. 2 is a side elevation of the same;

Fig. 3 is a front elevation;

Fig. 4 is a longitudinal section on the line 4—4 of Fig. 1;

Fig. 5 is a detail section showing a clutch mechanism which may be employed;

Fig. 6 is a sectional elevation of an elevator which takes up any excess seed which may accumulate in the passage to the transfer wheel;

Fig. 7 is a sectional elevation of the transfer wheel;

Fig. 8 is a detail rear elevation of a portion of the transfer wheel;

Fig. 9 is a sectional elevation of one form of mechanism for actuating the seed-feeding platform;

Fig. 10 is a view, partly in section and partly in plan, of the transfer wheel and the means whereby the seed is released from said wheel.

Figure 1:
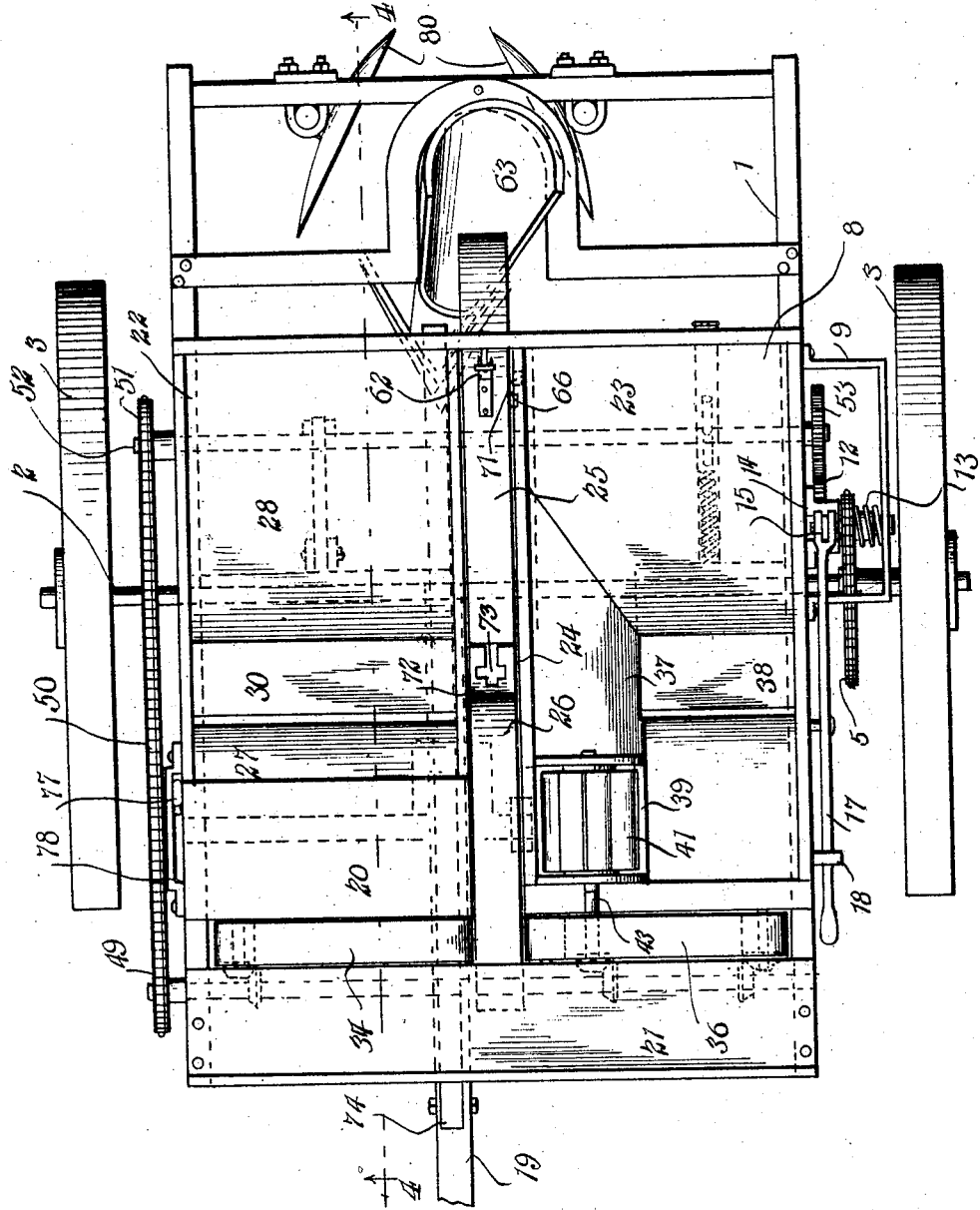
Figure 1 is a plan view of a planter constructed in accordance with the invention.

The main frame 1 consists of longitudinal beams and cross bars secured together in any preferred manner and arranged to properly support the working parts. Between the front and rear ends of the frame, an axle 2 is carried thereby and ground wheels 3 are rotatably mounted upon this axle. Mounted to rotate with the left hand wheel 3 is a sprocket wheel 4 and a sprocket chain 5 is trained about the same and about a sprocket pinion 6 which is loosely mounted on a stub shaft 7 carried by the side of the hopper 8 and a bracket 9 secured to the hopper. The hub of the sprocket 6 is constructed in one side with a clutch face 10 and keyed to the shaft 7 is a second clutch hub 11 which carries a gear wheel 12, the clutch hub of the sprocket wheel being normally pressed into engagement with the clutch hub 11 by a spring 13 coiled around the shaft 7 between the sprocket wheel and the bracket 9, as shown most clearly in Fig. 5. Slidably mounted in a keeper 14 on the side of the hopper is a link 15 carrying a fork 16 at its lower end which fork spans the shaft 7 and is tapered downwardly transversely of the machine so that when it is in an upper position it will permit engagement between the clutch members 10 and 11, but if it be pushed downwardly it will bear between washers or wear plates mounted on the said clutch members so as to spread the same and thereby shift the clutch members apart against the action of the spring 13 in an obvious manner. The link 15 is suspended from the rear end of a hand lever 17 which is fulcrumed upon the side of the hopper and extends forwardly where it may be easily reached by the operator, the lever being held to the side of the hopper by a keeper 18, as will be understood. When the clutch members are engaged, motion will be imparted to the seed-feeding mechanism, as will be presently explained, and when the clutch members are disengaged, the machine may be drawn over a road or field without operating to plant.

The hopper is mounted upon the main frame in any convenient or approved manner and a draft pole or tongue 19 is secured to the front end of the frame to permit the machine to be drawn over a field by a tractor or by draft animals. A seat 20 is provided on the top of the hopper and a foot board 21 is carried by the front end of the frame to serve as a foot rest and also as a cover or guard for some of the operating mechanism. As shown most clearly in Fig. 1, the hopper is so formed as to provide a seed compartment 22 which carries the main supply of seed, a smaller seed compartment 23 at the opposite side and an intermediate compartment which is relatively narrow to accommodate the transfer wheel 25 and the belt 26 leading to the transfer wheel. Each hopper is constructed with a front wall 27 and a rear wall 28 which converge downwardly, as clearly shown in Fig. 4, the lower edges of these walls being spaced apart to provide a discharge opening for the seed, and below the said opening a transverse bar 29 extends between the sides of the hopper to reinforce the structure and also form a guide for the pusher or movable platform whereby the seed is fed from the hopper. The pusher may be conveniently constructed of sheet metal and is in the form of a substantially U-shaped device set on its side, the upper member 30 of the pusher being shorter than the lower member 31 thereof, and said members being connected by a bridge portion 32 disposed at the rear of the supporting and guiding bar 29. The upper member 30 of the pusher fits slidably but closely between the edge of the rear wall 28 and the upper side of the member 29 and, consequently, serves as a closure for said space so that the seed cannot work out at the rear of the hopper and the lower member 31 rests upon and slides on a platform 33 which spans the front portion of the hopper below the seed outlet of the same and is of sufficient longitudinal extent so that at no time will the lower member 31 of the pusher clear the platform. The pusher reciprocates longitudinally of the machine and upon its forward stroke will push from the platform any seed which may be thereon and will deliver the same onto a conveyer belt 34 which is disposed transversely of the machine between the front side of the hopper and the rear edge of the foot board 21, as clearly shown in Figs. 1 and 4. This conveyer belt is supported by rollers 35 mounted adjacent the sides of the hopper and its upper run travels inwardly so that the seed deposited thereon will be delivered onto the central longitudinal conveyer belt 26 and by the latter delivered to the transfer wheel. A similar conveyer belt 36 is mounted in a similar position between the front end of the hopper 23 and the foot board 21 and this conveyer is so actuated that its upper run also travels inwardly to deliver onto the intermediate longitudinally extending belt 26.

The hopper 23 is of similar construction to the hopper 22, but its inner side wall 37 is inclined inwardly and downwardly, as shown most clearly in Fig. 1, so that this hopper is of less capacity than the main hopper 22. Operating in the bottom of the hopper 23 is a pusher 38 which is of the same construction as the first described pusher operating in the hopper 22 whereby the seed from the compartment 23 will be delivered onto the conveyer belt 36. At the inner side of the compartment 23 and the front end thereof, there is erected an elevator 39 in the form of an endless belt 40 having buckets or take-up bars 41 secured thereto, the casing 39 of the elevator having an opening 42 in its inner side at its lower end whereby any excessive accumulation of seed upon the conveyer 26 may pass to the elevator, it being noted upon reference to Fig. 6 that the belt 26 works closely between the side of the compartment 22 and the elevator casing. The belt 40 is trained around drums or rollers 42 at the top and bottom of the elevator casing and the shaft 43 of the lower roller or drum 42 is extended forwardly to pass between the runs of the conveyer 36 and is equipped at its front end with a beveled pinion 44 meshing with a similar pinion 45 upon a transverse shaft 46 mounted in suitable bearings upon the main frame, said shaft having secured thereto between its ends a drum or pulley about which the conveyer belt 26 is trained so that the said belt will be driven directly from the shaft. The outer rollers or drums which carry the respective conveyers 34 and 36 are each carried by a shaft which is journaled in the supporting frame of the hopper and equipped at its front end with a beveled pinion 47 each meshing with a beveled pinion 48 upon the shaft 46 whereby the belts will be driven in the proper direction. One end of the shaft 46 is projected beyond the left hand side of the hopper and is equipped with a sprocket gear 49 about which is trained a sprocket chain 50 which is also trained about a sprocket pinion 51 carried on the left end of a transmission shaft 52. Said shaft 52 is journaled in and extends between the extreme sides of the hopper and at its left hand end carries a gear 53 which meshes with the gear 12 hereinbefore described. The transfer wheel 25 is secured directly to the shaft 52 to be rotated thereby and the pushers are also driven by this shaft. In Fig. 4, I have shown the pusher connected by a link 54 with a crank 55 of the shaft and this arrangement is highly efficient.

In Fig. 9, I have shown an arrangement for operating the pusher whereby the mechanism is not directly connected with the shaft 52 but is actuated by means of strikers 56 projecting radially from said shaft. These strikers impinge upon a rocking arm 57 which is hinged at its upper end to the rear side of the hopper, as indicated at 58, and has its lower end connected with the pusher by a coupling bar or link 59. A retractile spring 60 secured to the rocking arm and to a fixed part of the machine in advance of the arm serves to hold the same to the strikers and to move it forward after it has been retracted by either striker.

The transfer wheel 25 is provided with radial pockets 61 which may be provided in any desired number, although ordinarily two pockets disposed at diametrically opposite points of the wheel will be found sufficient. Secured upon the periphery of the wheel at the rear of each pocket in the direction of rotation of the wheel is a fork 62 which is adapted to take up seed and carry it around to the seed tube or spout 63 through which it will gravitate to a furrow formed by a furrow opener 64 secured to the lower end of the seed tube. Pivoted within each pocket 61 is a clearing or ejecting element 65 consisting of a bar or lever fulcrumed between its ends and having its outer end disposed to engage with the fork 62 at the rear of the same and its inner end equipped with a laterally projecting finger 66 which extends through an arcuate slot 67 formed in the side of the transfer wheel at the inner end of the pocket. The outer end of the ejector is provided with radially spaced lugs 68 on each side which are adapted to ride at the inner and outer sides of the fork 62 with the shank of the ejector fitting between the tines or points of the fork, as will be understood upon reference to Figs. 7 and 8. The ejecting bar is normally held with its outer end at the rear of the fork, as shown in Fig. 7, by a spring 69 secured in the pocket 61 and bearing against the ejector while the lateral finger 66 is adapted to be actuated at the proper point in the rotation of the transfer wheel to rock the ejector and cause its outer end to ride forwardly relative to the fork and remove the seed therefrom, the action being so timed that the removed seed will pass at once into the seed tube or spout 63. To effect the stated action of the ejector, a frame bar 70 which is disposed between the compartments of the hopper and at one side of the transfer wheel is so disposed that it will project into the path of the finger but it is constructed at spaced points with notches 71 which will permit the finger to pass, the forward notch being so located that the finger may pass through the same without causing relative movement of the ejector, but the rearmost notch is disposed in rear of the point of engagement of the finger with the frame bar so that the finger will impinge against the bar, as shown in Fig. 10, and then as the rotation of the transfer wheel continues will be pushed back in the arcuate slot 67. The rotation of the wheel, however, carries the finger rearwardly so that eventually the ejector will assume a position substantially radial to the wheel and in this position the finger will engage and pass through the rear slot 71, whereupon the spring 69 will at once return it to its normal position at the rear of the fork. The relative swinging movement imparted to the ejector by the engagement of the finger 66 with the frame bar 70 will cause the outer end of the ejector to swing forwardly relative to the fork 62 and, consequently, will remove the seed therefrom.

It will be noted that the seed spout 63 is inclined so that it may clear the lower portion of the transfer wheel and avoid frictional contact therewith or interfering with the travel of the seed-carrying fork and the ejector, it being also noted that the front side of the seed tube is cut away so as to provide ample clearance for these parts and insure the delivery of the seed into the tube.

The conveyer belt 26 does not extend rearwardly far enough to deliver the seed directly onto the forks of the transfer wheel but there is interposed between said conveyer and the wheel a cup 72 which receives a seed from the conveyer and holds it until such time as the rotation of the transfer wheel brings a fork into position to take up the seed. The bottom of the cup is constructed with a substantially cruciform slot 73 which will permit the passage of a fork and its cooperating ejector but will prevent the seed dropping from the cup.

The furrow opener 64 and the seed tube 63 are carried by the rear end of a beam 74 which is so arranged and shaped as to pass over the axle 2 to the front end of the frame where it is pivoted in alinement with the draft tongue. A rock shaft 75 is mounted transversely in the frame near the front end thereof and passes below the beam 74, being equipped with a crank or lifting arm 76 which is adapted to engage under the beam and support the same so that the furrow opener will penetrate the soil to the desired depth. Upon the right hand end of this shaft is secured a hand lever 77 which works in a keeper 78 secured on the side of the hopper and is equipped with a latch cooperating with the usual holding segment 79 whereby to lock the shaft in any position in which it may be set. By properly setting the lever, the beam 74 will be raised or lowered and the furrow opener thus adjusted. Covering disks 80 are mounted at the rear end of the frame in any convenient manner so as to run behind the furrow opener and turn the loose soil over onto the deposited seed.

Having thus described the invention, I claim:

1. In a planter, the combination of a seed tube arranged to deliver seed to the ground, a transfer wheel in advance of the seed tube and having a substantially radial chamber and an arcuate slot in its side at the inner end of the chamber, means for delivering seed to the transfer wheel, a fork fixed on the periphery of the wheel adjacent said chamber to take up the delivered seed, an ejector element pivotally mounted within the radial chamber of the wheel and having its outer end constructed to rest at the rear of the fork and its inner end provided with a lateral finger projecting through the arcuate slot in the side of the wheel, and a stationary bar arranged at the side of the wheel and projecting into the path of said finger whereby to rock the ejector element and discharge the seed into the seed tube, said bar being provided with a notch to permit passage of the finger after the seed is ejected.

2. In a planter, the combination of a hopper having a seed outlet in its bottom, a stationary platform arranged below the hopper in advance of the seed outlet, a pusher reciprocating in a rectilinear path through the bottom of the hopper at said outlet and over the platform, seed-depositing mechanism at the rear of the hopper, and means for conveying seed from the platform to the seed-dropping mechanism.

3. In a planter, the combination of a hopper having a seed outlet in its bottom, a transverse guide element immediately below the said outlet, a platform below the outlet and in advance of the same, and a pusher mounted to reciprocate below the said outlet and having an upper member extending over the guide element and a lower member fixed to the upper member at the rear of the guide element extending under the guide element and resting on the platform.

4. In a planter, the combination of a hopper, a seed-depositing mechanism at the rear and at one side of the hopper, means for feeding seed forwardly from the hopper, and conveyers arranged in advance and at the side of the hopper for transferring seed from said feeding means to the seed-depositing mechanism.

5. In a planter, the combination of hoppers, a seed-depositing mechanism arranged at the rear and between the hoppers, means for feeding seed from the hoppers to the front thereof, conveyers carrying the seed from the front of the hoppers inwardly to a point alined with the seed-depositing mechanism, and a conveyer receiving the seed from the first-mentioned conveyers and carrying it to the seed-depositing mechanism.

6. In a planter, the combination of a pair of hoppers, a seed-depositing mechanism arranged between the hoppers and at the rear thereof, a conveyer leading rearwardly from the front of the hoppers to said seed-depositing mechanism, transverse conveyers conveying seed from the hoppers to the first-mentioned conveyer, and an elevator arranged within one of the hoppers and receiving excess seed from the first-mentioned conveyer and returning it to said hopper.

In testimony whereof I affix my signature.

BENJAMIN ZENDRON. [L. S.]